No. 858,697. PATENTED JULY 2, 1907.
A. M. ANDERSON & C. QUESNELL.
HARVESTER.
APPLICATION FILED JULY 27, 1906.
2 SHEETS—SHEET 2.
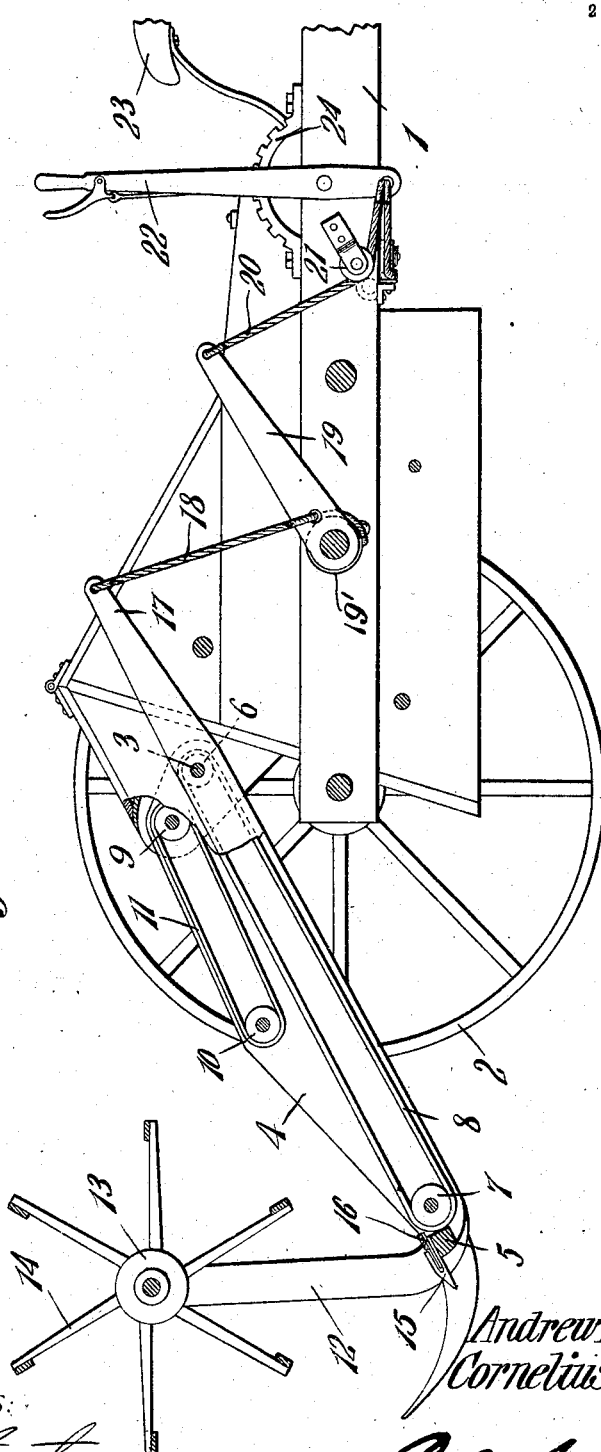

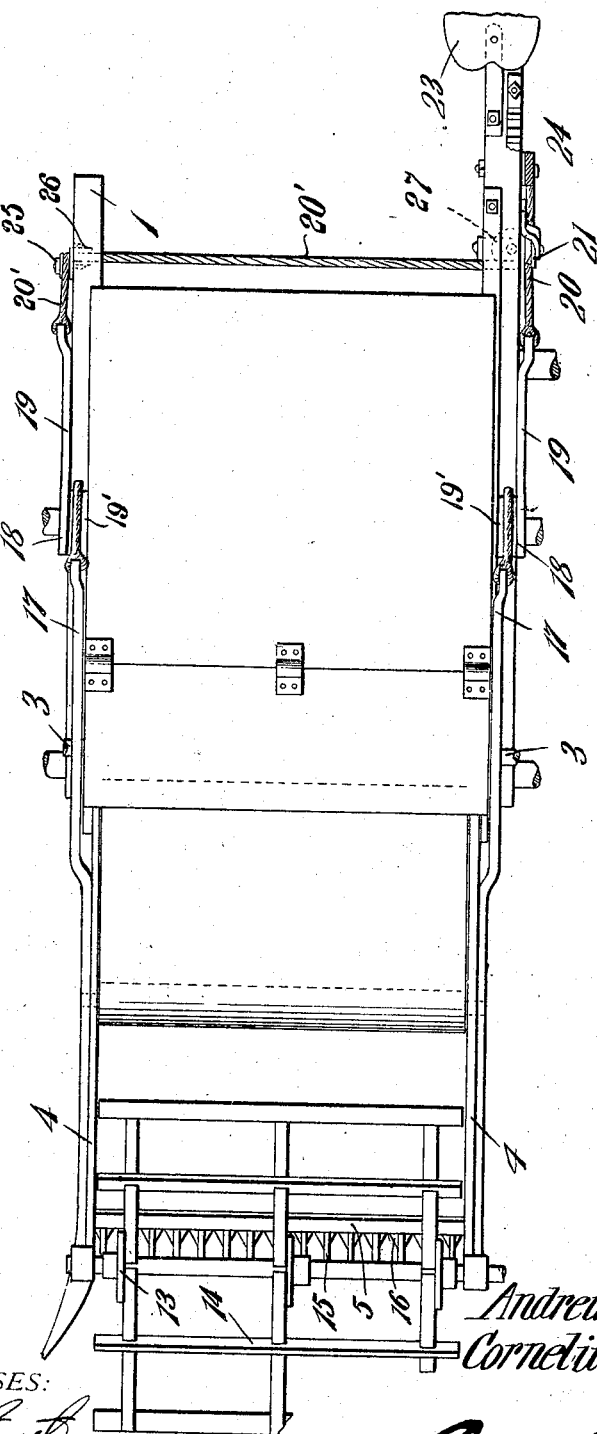

UNITED STATES PATENT OFFICE.

ANDREW M. ANDERSON AND CORNELIUS QUESNELL, OF MOSCOW, IDAHO.

HARVESTER.

No. 858,697.        Specification of Letters Patent.        Patented July 2, 1907.

Original application filed May 25, 1905, Serial No. 262,275. Divided and this application filed July 27, 1906. Serial No. 328,140.

*To all whom it may concern:*

Be it known that we, ANDREW M. ANDERSON and CORNELIUS QUESNELL, citizens of the United States, residing at Moscow, in the county of Latah and State of Idaho, have invented a new and useful Harvester, of which the following is a specification.

This invention relates to harvesters and more particularly to means for adjusting the platforms thereof and is a division of an application filed in the United States Patent Office by us on May 25, 1905, Serial No. 262,275.

The object of the invention is to provide simple means whereby the cutting and conveying mechanism of a harvester may be adjusted to any desired angle in relation to the ground.

With the above and other objects in view the invention consists of certain novel features of construction and combinations of parts which will be hereinafter more fully described and pointed out in the claims.

In the accompanying drawings is shown the preferred form of the invention.

In said drawings: Figure 1 is a plan view of the body of a combined harvester and thresher having our improved adjusting mechanism, the wheels and actuating mechanism of the machine being removed; and Fig. 2 is a side elevation of the machine with the actuating mechanism of the thresher and harvester removed, a portion of the harvester being shown in section.

Referring to the figures by characters of reference, 1 is the main frame of the machine the same preferably housing suitable threshing mechanism (not shown) and being movably mounted on wheels 2. A shaft 3 extends through the upper portion of the front of the frame 1 and mounted thereon are side beams 4 of a pivoted frame which beams are connected at their lower ends by a sickle bar 5. A roller 6 is mounted on the shaft 3 and another roller 7 is disposed between the lower portions of the side beams 4 and adjacent the sickle bar 5 and on these rollers is mounted an endless carrier or draper 8. A roller 9 is disposed adjacent the roller 3 and another roller 10 is disposed between the side beams 4 adjacent the centers of the upper edges thereof and on these two rollers 9 and 10 is mounted another carrier 11 which is arranged at an angle to the carrier 8. Any suitable mechanism may be employed for operating these carriers and it is not therefore deemed necessary to go into a detailed description thereof. The side beams 4 are provided at their lower ends with standards 12 carrying a reel 13 and dividers 14 extend forward from the sickle bar and in advance of the guards 15 and the sickle 16. The sickle may be actuated by any suitable mechanism in the ordinary manner and as said mechanism does not constitute a part of the present invention it is not deemed best to describe the same.

Arms 17 extend rearwardly from the side beams 4 and have cables 18 connected to the ends thereof and extending downward to a spool 19′ from the ends of which extend levers 19. A cable 20 is connected to the free end of one of the levers 19 and extends downward under pulley 21 and thence rearwardly to the operating lever 22 disposed adjacent the driver's seat 23. Still another cable 20′ extends from the other lever 19 and downward over a pulley 25 and under another pulley 26 from which it extends transversely of the machine and around the pulley 27 to the lever 22. Any suitable means such as a rack 24 may be provided for locking the lever 22 in adjusted position. By providing adjusting means such as herein described the entire platform of the harvester can be quickly raised or lowered by manipulating the lever 22. In view of the fact that the cables 20 and 21′ are connected to lever 22 near its fulcrum and to the ends of levers 19 and in view also of the fact that the cables 18 are connected to the spool 19′ and to the arms 17 it is apparent that the leverage is greatly increased and the operator can, with little exertion, lift the heavy frame of the harvester to a desired elevation. The adjusting mechanism is very simple in construction and enables the operator to quickly lift the harvester mechanism so as to avoid any obstructions which may be in the path of the machine.

The preferred form of the invention has been set forth in the foregoing description but we do not limit ourselves thereto as we are aware that modifications may be made therein without departing from the spirit or sacrificing any of the advantages thereof, and we therefore reserve the right to make such changes as fairly fall within the scope of the claims.

What is claimed is:

1. In a machine of the character described the combination with a main frame; of a frame pivotally connected thereto, harvesting mechanism carried by said pivoted frame, an operating lever connected to the main frame, intermediate levers, a flexible connection between the operating lever and intermediate levers and between said intermediate levers and the pivoted frame for transmitting motion from the lever to the pivoted frame.

2. In a machine of the character described the combination with a main frame; of a frame pivotally connected thereto, harvesting mechanism carried thereby, arms extending rearwardly from the pivoted frame, intermediate levers fulcrumed upon the main frame, connections between the ends of the arms and the intermediate levers, said connections being fastened to the intermediate levers adjacent their fulcrums, and means for actuating the intermediate levers.

3. In a machine of the character described the combination with a main frame; of a frame pivotally mounted thereon, harvesting mechanism carried thereby, arms extending beyond the fulcrums of the pivoted frame, intermediate levers fulcrumed upon the main frame, a spool movable with the intermediate levers connecting devices attached to said spool and to the ends of the arms, flexible devices connected to the ends of the intermediate levers, and means for actuating said devices to move the levers and arms and to adjust the pivoted frame.

4. In a machine of the character described the combination with a main frame; of a frame pivotally mounted thereon, harvesting mechanism carried by the pivoted frame, rearwardly extending arms upon the pivoted frame and adjacent its fulcrum, intermediate levers fulcrumed upon the main frame, connecting devices connected to said levers adjacent their fulcrums and to the ends of the arms, an operating lever, means for locking said lever in adjusted position, and flexible connections between said lever and the ends of the intermediate lever.

5. In a machine of the character described the combination with a main frame; of a frame pivotally connected thereto, harvesting mechanism carried thereby, an intermediate lever fulcrumed upon the main frame, a flexible connection between said lever and the pivoted frame, and an operating lever for actuating the intermediate lever for swinging the frame upon its pivot.

In testimony that we claim the foregoing as our own, we have hereto affixed our signatures in the presence of two witnesses.

ANDREW M. ANDERSON.
CORNELIUS QUESNELL.

Witnesses:
W. H. GLIDDEN,
FRED VEATCH.